(12) United States Patent
Pamulaparthy et al.

(10) Patent No.: US 10,121,349 B2
(45) Date of Patent: Nov. 6, 2018

(54) MACHINE PROTECTION AND DIAGNOSTIC SYSTEMS AND METHODS

(71) Applicant: General Electric Technology GmbH, Baden (CH)

(72) Inventors: Balakrishna Pamulaparthy, Hyderabad (IN); Balamourougan Vinayagam, Markham (CA); Madu Thirugnanasam Moorthy, Markham (CA); Mitalkumar Kanabar, Markham (CA); Vijayasarathi Muthukrishnan, Markham (CA)

(73) Assignee: General Electric-Technology GMBH, Baden (CH)

( * ) Notice: Subject to any disclaimer, the term of this patent is extended or adjusted under 35 U.S.C. 154(b) by 0 days.

(21) Appl. No.: 15/349,538

(22) Filed: Nov. 11, 2016

(65) Prior Publication Data

US 2018/0082568 A1 Mar. 22, 2018

(30) Foreign Application Priority Data

Sep. 21, 2016 (IN) ............................ 2016 410 32195

(51) Int. Cl.
*G05B 19/4065* (2006.01)
*G08B 21/18* (2006.01)
(Continued)

(52) U.S. Cl.
CPC .......... *G08B 21/182* (2013.01); *G01M 99/008* (2013.01); *G05B 23/0283* (2013.01); *G06N 5/022* (2013.01)

(58) Field of Classification Search
CPC .................................................. G08B 21/182
See application file for complete search history.

(56) References Cited

U.S. PATENT DOCUMENTS 7,840,395 B2 11/2010 Nasle et al.
8,155,908 B2 4/2012 Nasle et al.
(Continued)

FOREIGN PATENT DOCUMENTS

WO 2003/060536 A1 7/2003

OTHER PUBLICATIONS

Nandi et al., "Condition Monitoring and Fault Diagnosis of Electrical Motors—A Review," IEEE Transactions on Energy Conversion, 2005, vol. 20, No. 4, pp. 719-729.
(Continued)

*Primary Examiner* — Joseph Feild
*Assistant Examiner* — Pameshanand Mahase
(74) *Attorney, Agent, or Firm* — Eversheds-Sutherland (US) LLP

(57) ABSTRACT

One or more embodiments of the disclosure pertain to a protection and diagnostic system that can generate a trip/alarm signal by executing a diagnostic procedure upon a machine that includes a rotating part. The diagnostic procedure can include using sensors to obtain performance parameters of various tagged critical and/or less critical sub-systems of the machine when the rotating part is rotating; determining, in real time, a system performance index of the machine based on the performance parameters; using a protection model to determine a sub-system performance index associated with at least one tagged sub-system of the machine; determining an asset health index based on combining the system performance index and the sub-system performance index; and generating the trip/alarm signal when the asset health index exceeds a threshold value. The protection system can include a protection device configured to receive the trip signal and execute a protective action upon the machine.

20 Claims, 9 Drawing Sheets

(51) Int. Cl.
    *G01M 99/00*     (2011.01)
    *G06N 5/02*     (2006.01)
    *G05B 23/02*     (2006.01)

(56) References Cited

U.S. PATENT DOCUMENTS

| | | | |
|---|---|---|---|
| 2006/0259271 A1 | 11/2006 | House et al. | |
| 2007/0286089 A1* | 12/2007 | Nasle | G06F 17/5009 370/245 |
| 2011/0213744 A1* | 9/2011 | Sparling | G05B 23/0227 706/46 |
| 2013/0253898 A1* | 9/2013 | Meagher | G06F 17/5009 703/18 |
| 2015/0106058 A1 | 4/2015 | Mazzaro et al. | |
| 2015/0236631 A1* | 8/2015 | Wang | H02P 21/08 318/812 |
| 2016/0110983 A1* | 4/2016 | Gandhi | G08B 21/02 340/573.1 |
| 2017/0102678 A1* | 4/2017 | Nixon | G05B 17/02 |

OTHER PUBLICATIONS

Lu et al., "Online and Remote Motor Energy Monitoring and Fault Diagnostics Using Wireless Sensor Networks," IEEE Transactions on Industrial Electronics, 2009, vol. 56, Issue 11, pp. 4651-4659.
European Search Report issued in Application No. 17190357.8, dated Feb. 20, 2018 (7 pages).

* cited by examiner

| 1 | Operational Learned Data |
|---|---|
| 2 | Motor Start Summary |
| 3 | Motor Stop Summary |
| 4 | Integrated Fault Report |
| 5 | Asset Health Report |
| 6 | Motor models |
| 7 | External Monitoring & Diagnostics Data |
| 8 | Pre/Post Event Analysis |
| 9 | Electrical Signature Analysis |
| 10 | Diagnostics Event Log |
| 11 | Historical Max Record |
| 12 | Sub-system Analysis |
| 13 | Data Correlation/Analytics |
| 14 | Offline Data Analysis |

FIG. 3

MACHINE PROTECTION AND DIAGNOSTIC SYSTEMS AND METHODS

CROSS-REFERENCE TO RELATED APPLICATIONS

The present application claims priority to Indian Patent Application No. 201641032195, filed on Sep. 21, 2016, which is hereby incorporated by reference in its entirety herein.

TECHNICAL FIELD

This disclosure relates to protection and diagnostic systems, and more particularly, to protection and diagnostic systems associated with a machine having one or more rotating parts.

BACKGROUND

Certain types of machines, such as industrial-grade motors and generators, are often placed in operation for extended periods of time thereby subjecting various moving components of these machines to continuous wear and tear. A break-down, malfunction or development of an incipient fault in these types of machines is undesirable, particularly in view of costs associated with repairs and loss of service. Consequently, some critical components of such machines are traditionally monitored in a preemptive manner so as to collect performance data indicative of a potential breakdown or a possible maturing fault. However, due to various reasons such as cost of monitoring solution with respect to asset cost and associated maintenance efforts, relatively smaller machines (typically found in industrial or medium/low voltage applications) can be left unmonitored. In some cases, a malfunction or deterioration in one or more of these unmonitored machines may eventually contribute, directly or indirectly, to a malfunction or breakdown of the machine itself and/or an entire process cycle (such as manufacturing), leading to a loss in scheduled profits.

BRIEF DESCRIPTION OF THE DISCLOSURE

Certain embodiments of the disclosure can provide machine protection and diagnostic systems and methods. Some embodiments of the disclosure can provide protection and diagnostic systems associated with a machine having one or more rotating parts. Certain embodiments of the disclosure can provide a technical effect and/or solution pertaining to protection and diagnostics based at least in part on classifying a machine having one or more rotating parts into several sub-systems that can be monitored and protected in a pre-emptive manner using a diagnostic procedure. The diagnostic procedure can include determining a system performance index of the machine based on one or more performance parameters, and can also include using one or more protection and/or monitoring models to determine one or more sub-system performance indices associated with at least one sub-system of the machine. An asset health index can then be determined based on combining the system performance index and the one or more sub-system performance indices and one or more of a control signal, a trip signal, and an alarm signal can be generated when the asset health index and/or at least one system performance index exceeds a threshold value.

Accordingly, in one exemplary embodiment of the disclosure, a machine protection and diagnostic system can include a diagnostic system and a protection system. The diagnostic system can be configured to generate at least one of a trip signal or an alarm signal by executing a diagnostic procedure upon a machine having one or more rotating parts. The diagnostic procedure can include using one or more sensors coupled to the machine to obtain one or more performance parameters of the machine when the one or more rotating parts are rotating; determining, in real time, a system performance index of the machine based on the one or more performance parameters; using one or more protection models to determine at least one sub-system performance index that is associated with at least one sub-system of the machine; determining an asset health index based on combining the system performance index and the at least one sub-system performance index; and generating the at least one of the trip signal or the alarm signal when the asset health index exceeds a threshold value. The protection system can include a protection device configured to receive the trip signal and execute a protective action upon the machine.

According to another exemplary embodiment of the disclosure, a system can include at least one sensor, a database, and a diagnostic system. The at least one sensor can be coupled to a machine containing one or more rotating parts and can be configured to obtain one or more performance parameters of the machine when the one or more rotating parts are rotating. The database can be configured to at least store data indicative of a historical trend of the one or more performance parameters. The diagnostic system can include a processor, the processor configured to execute a diagnostic procedure. The diagnostic procedure can include determining, in real time, a system performance index of the machine based on the one or more performance parameters obtained by the at least one sensor; using the data stored in the database to determine at least one sub-system performance index that is associated with at least one sub-system of the machine; determining an asset health index based on combining the system performance index and the at least one sub-system performance index; and generating at least one of a warning signal or a trip signal when the asset health index exceeds a threshold value, the trip signal operative to initiate a protective action upon the machine.

According to yet another exemplary embodiment of the disclosure, a non-transitory computer-readable storage medium can contain instructions executable by a computer for performing operations that can include obtaining from one or more sensors coupled to a machine, one or more performance parameters of the machine when at least one rotating part of the machine is rotating; determining, in real time, a system performance index of the machine based on the one or more performance parameters; using one or more protection models to determine at least one sub-system performance index that is associated with at least one sub-system of the machine; determining an asset health index based on combining the system performance index and the at least one sub-system performance index; generating a trip signal when the asset health index exceeds a threshold value; and transmitting the trip signal to at least one protection device to execute a protective action upon the machine.

Other embodiments and aspects of the disclosure will become apparent from the following description taken in conjunction with the following drawings.

BRIEF DESCRIPTION OF THE DRAWINGS

Figure 1:
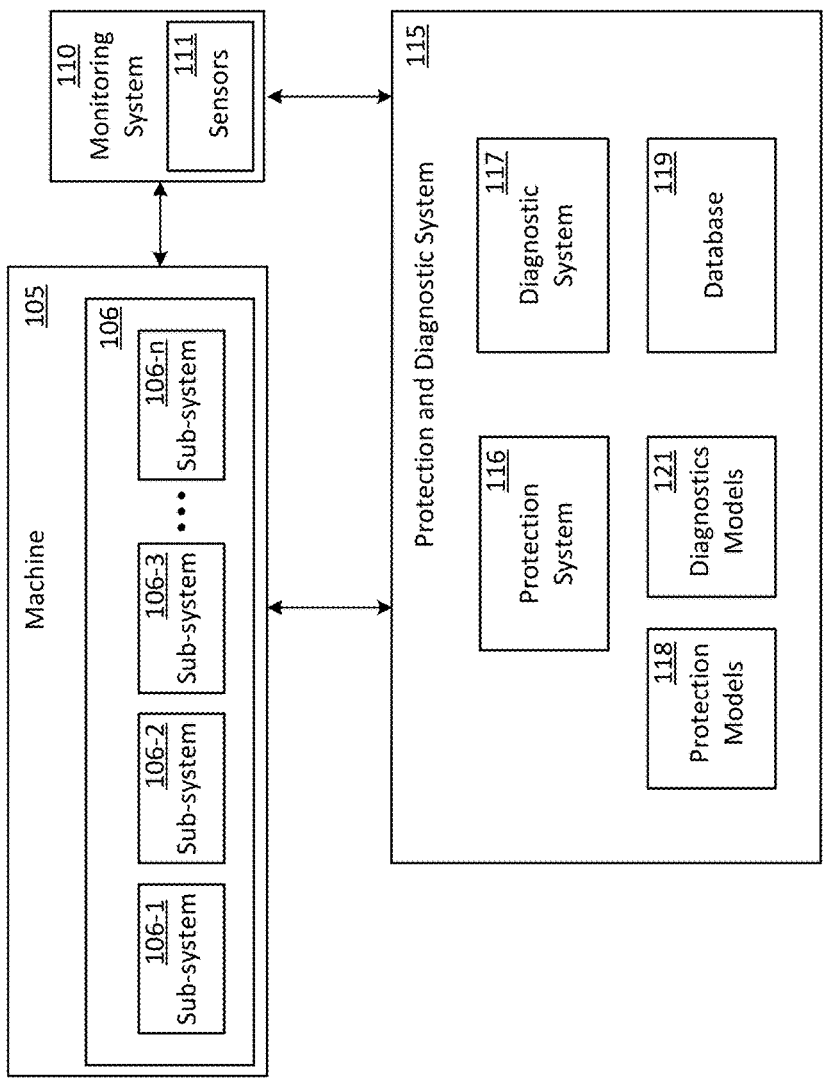

Having thus described the disclosure in general terms, reference will now be made to the accompanying drawings, which are not necessarily drawn to scale, and wherein:

FIG. 1 shows an exemplary protection and diagnostic system coupled to a machine that is characterized as one or more sub-systems in accordance with an embodiment of the disclosure.

Figure 2:
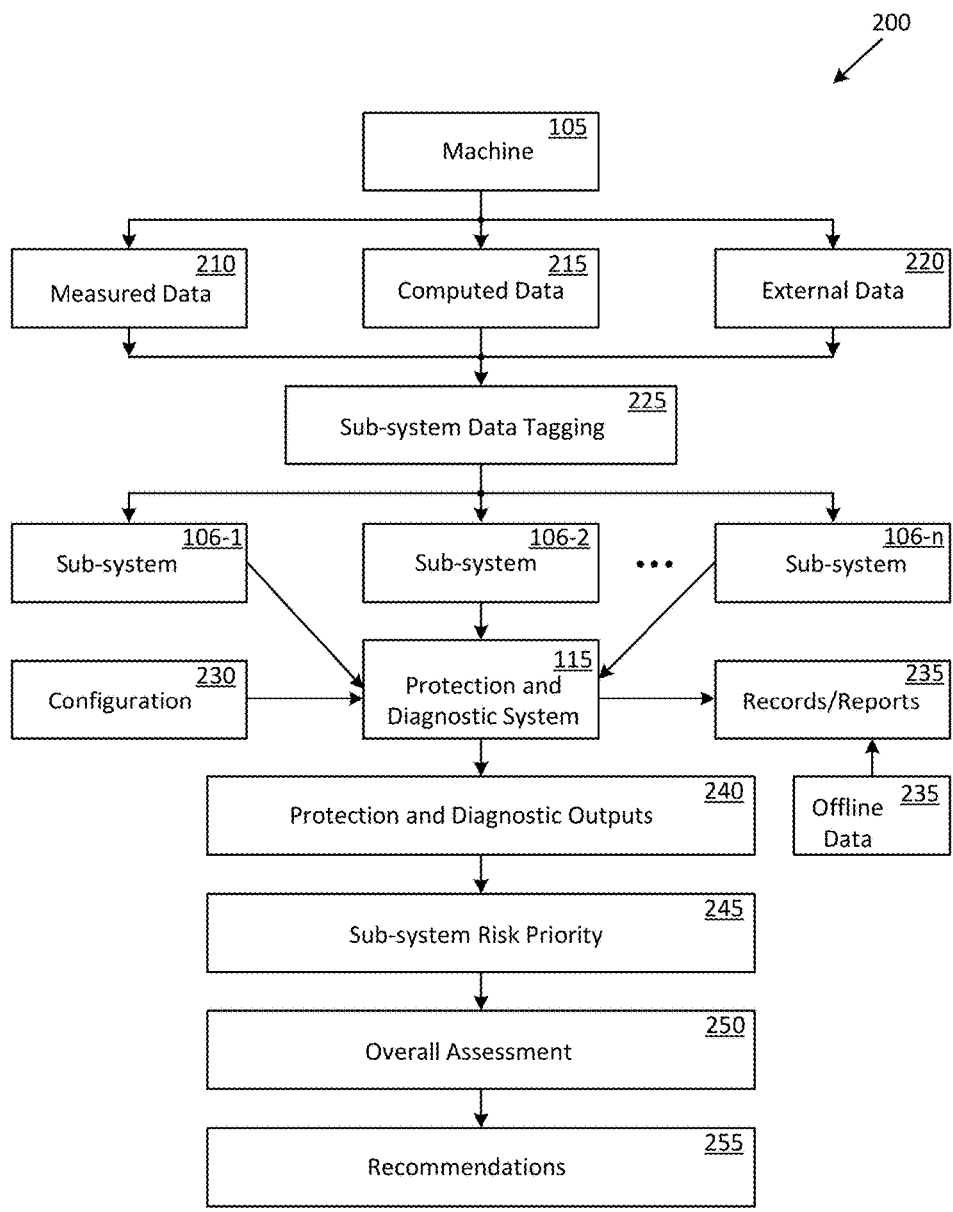

FIG. 2 shows an exemplary architectural block diagram that can be used to implement a protection and diagnostic procedure in accordance with an embodiment of the disclosure.

Figure 4:
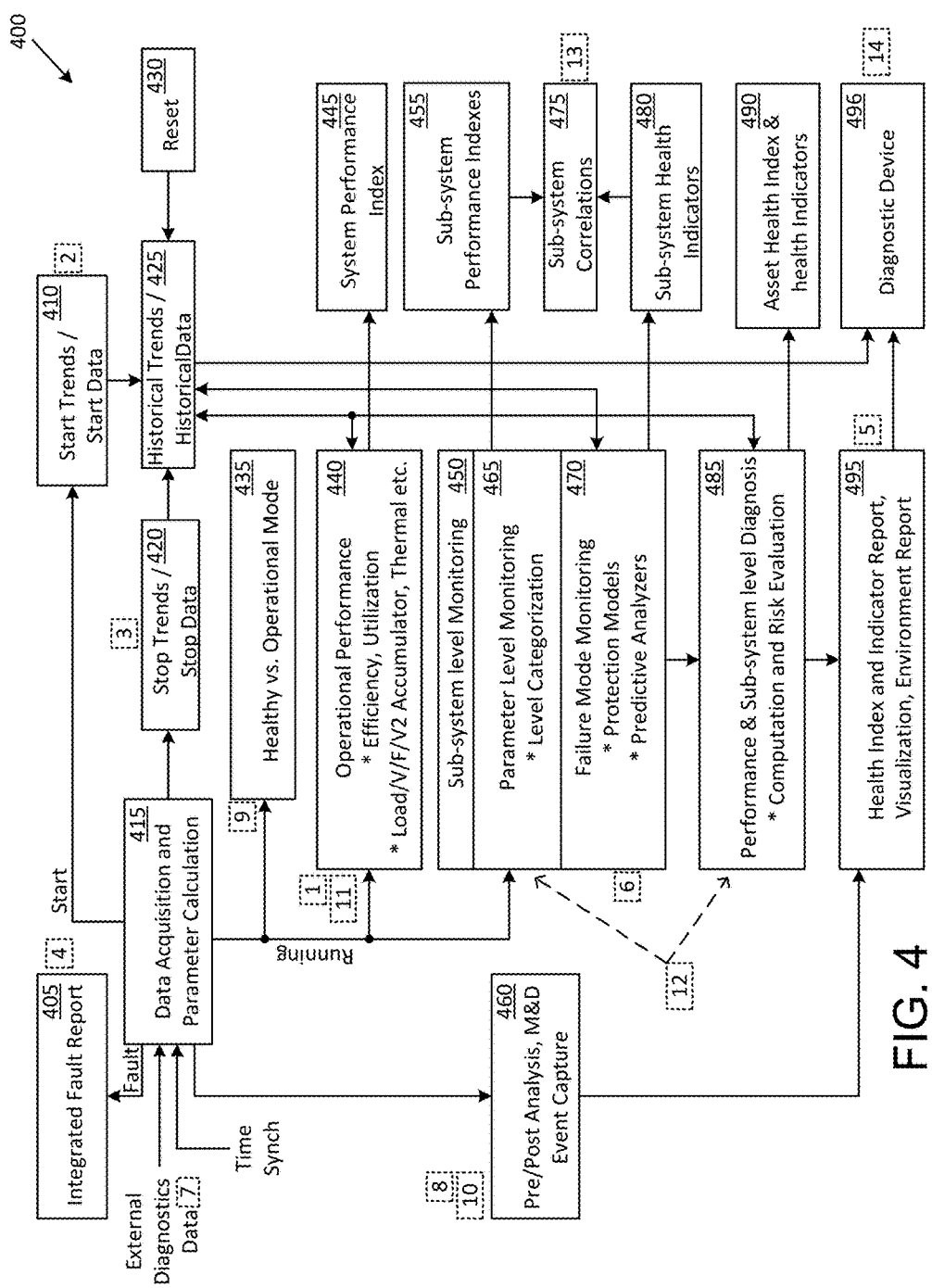

FIG. 3 shows an exemplary list of features that can be provided in a protection and diagnostic system in accordance with an embodiment of the disclosure FIG. 4 illustrates an exemplary operational architecture of a protection and diagnostic system incorporating at least some of the exemplary list of features shown in FIG. 3.

Figure 5:
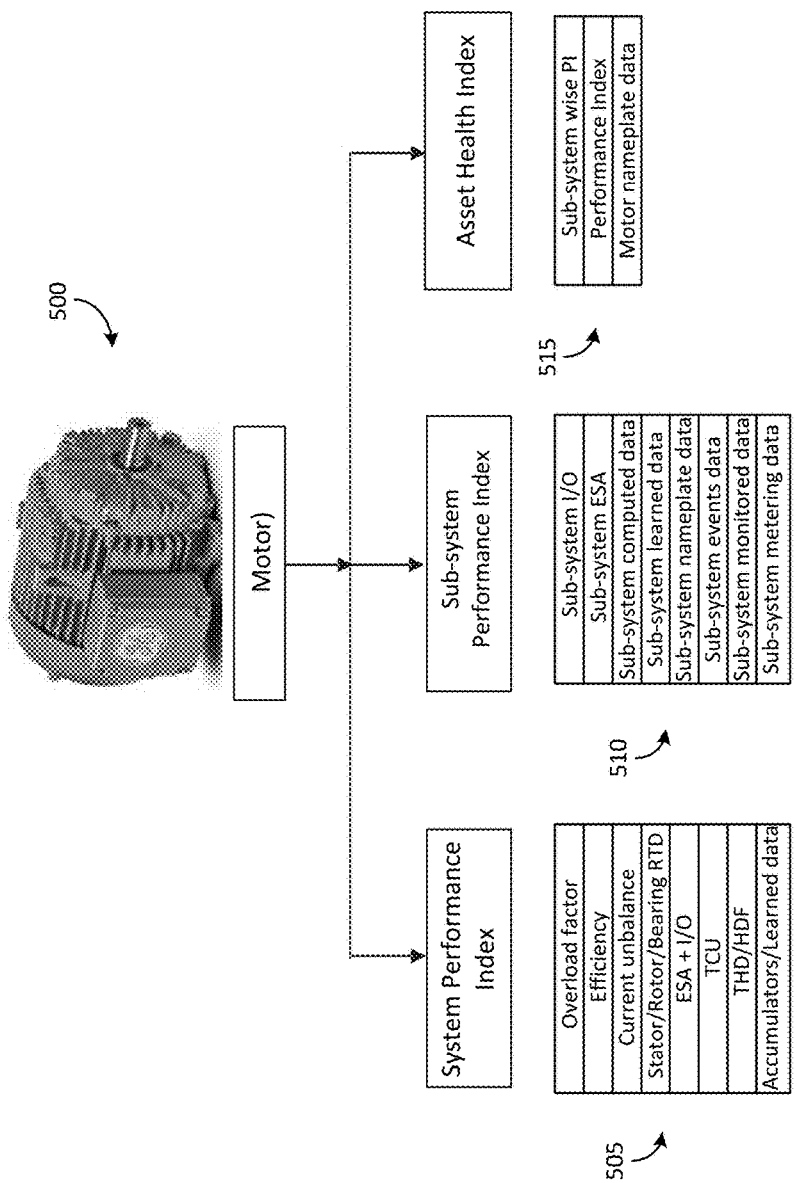

FIG. 5 illustrates exemplary aspects of a protection and diagnostic system when applied to a motor in accordance with an embodiment of the disclosure.

Figure 6:
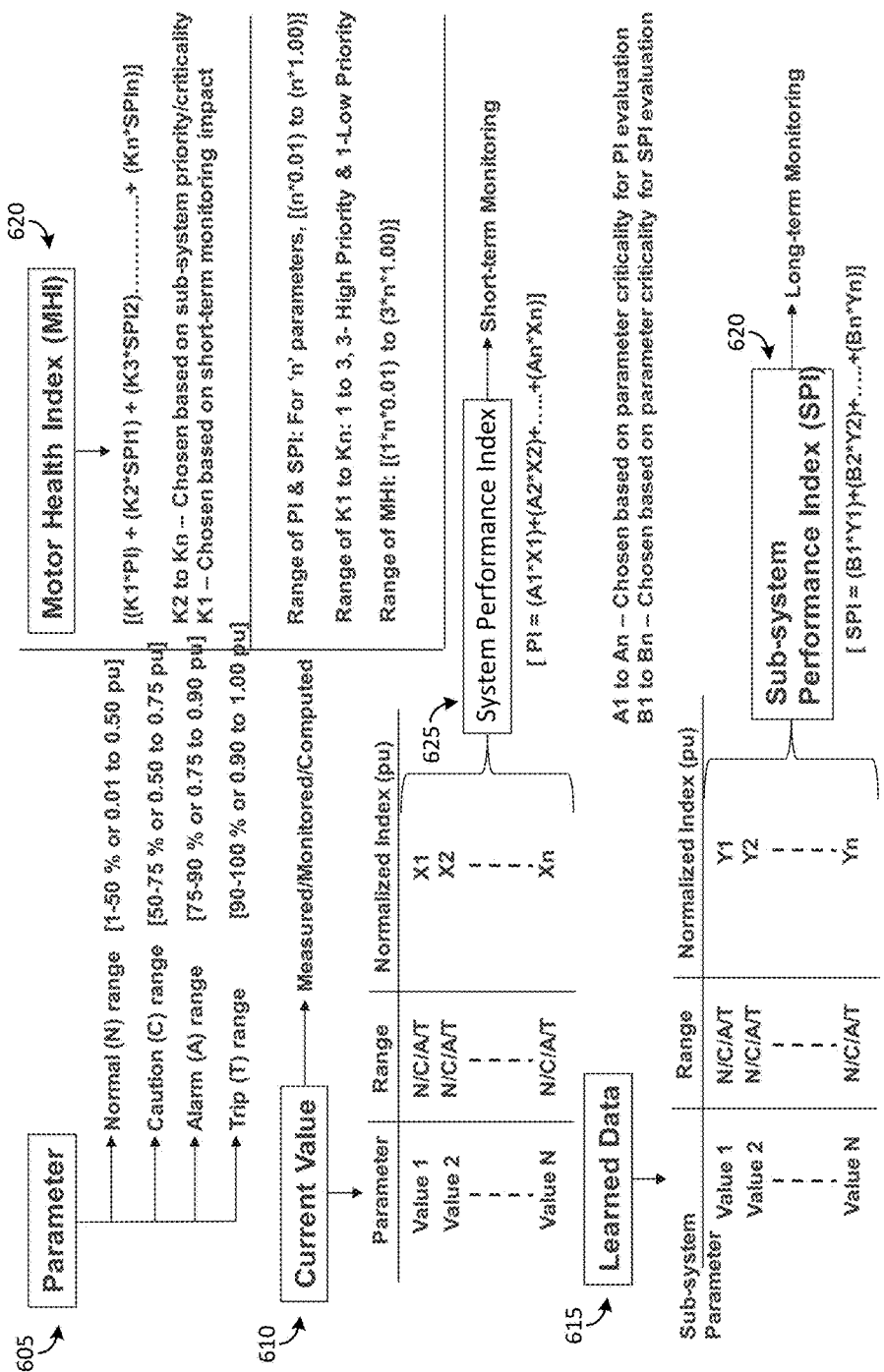

FIG. 6 illustrates a scheme indicating a few example aspects that can be considered when computing some performance indexes in accordance with an embodiment of the disclosure.

Figure 7:
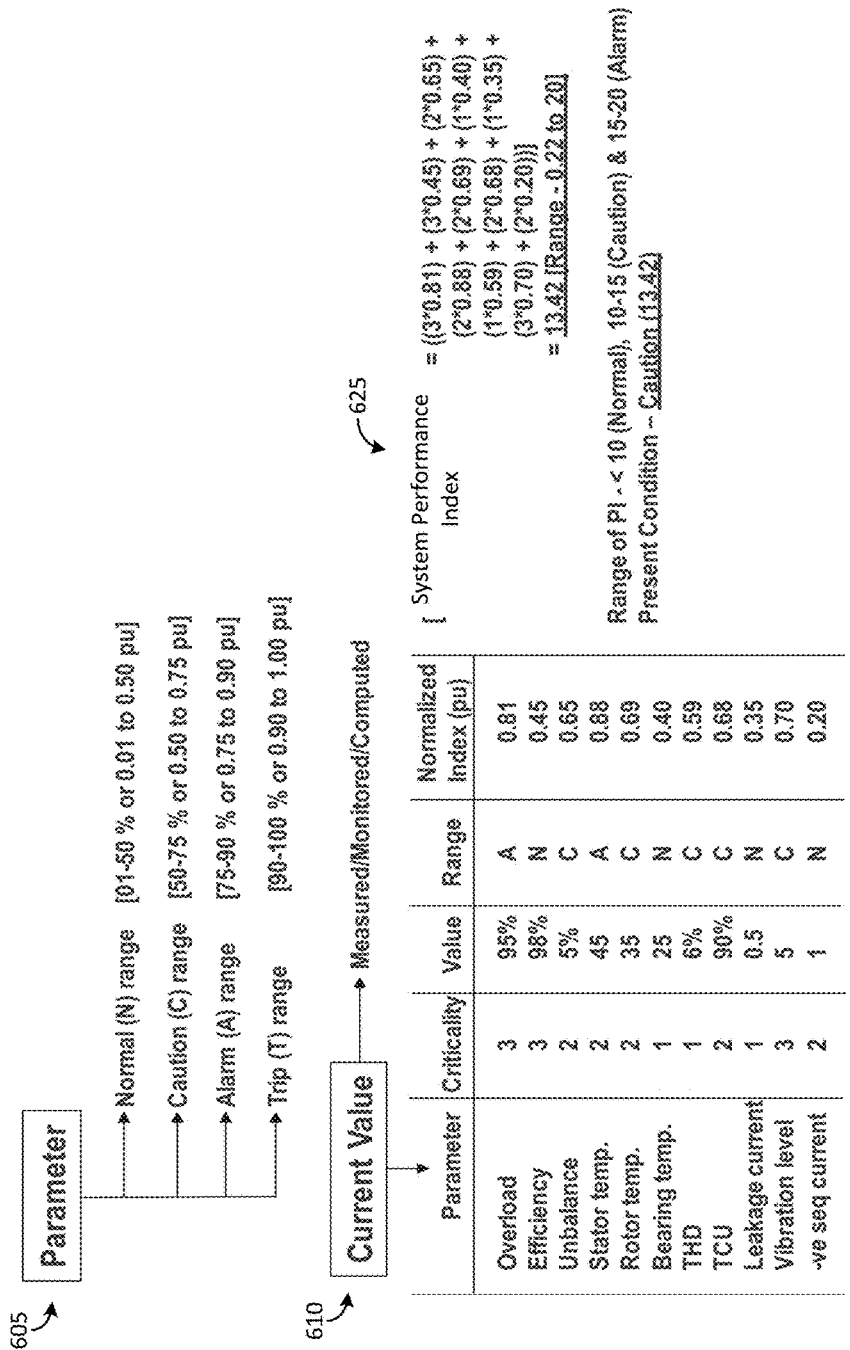

FIG. 7 illustrates an example implementation of the scheme shown in FIG. 6.

Figure 8:
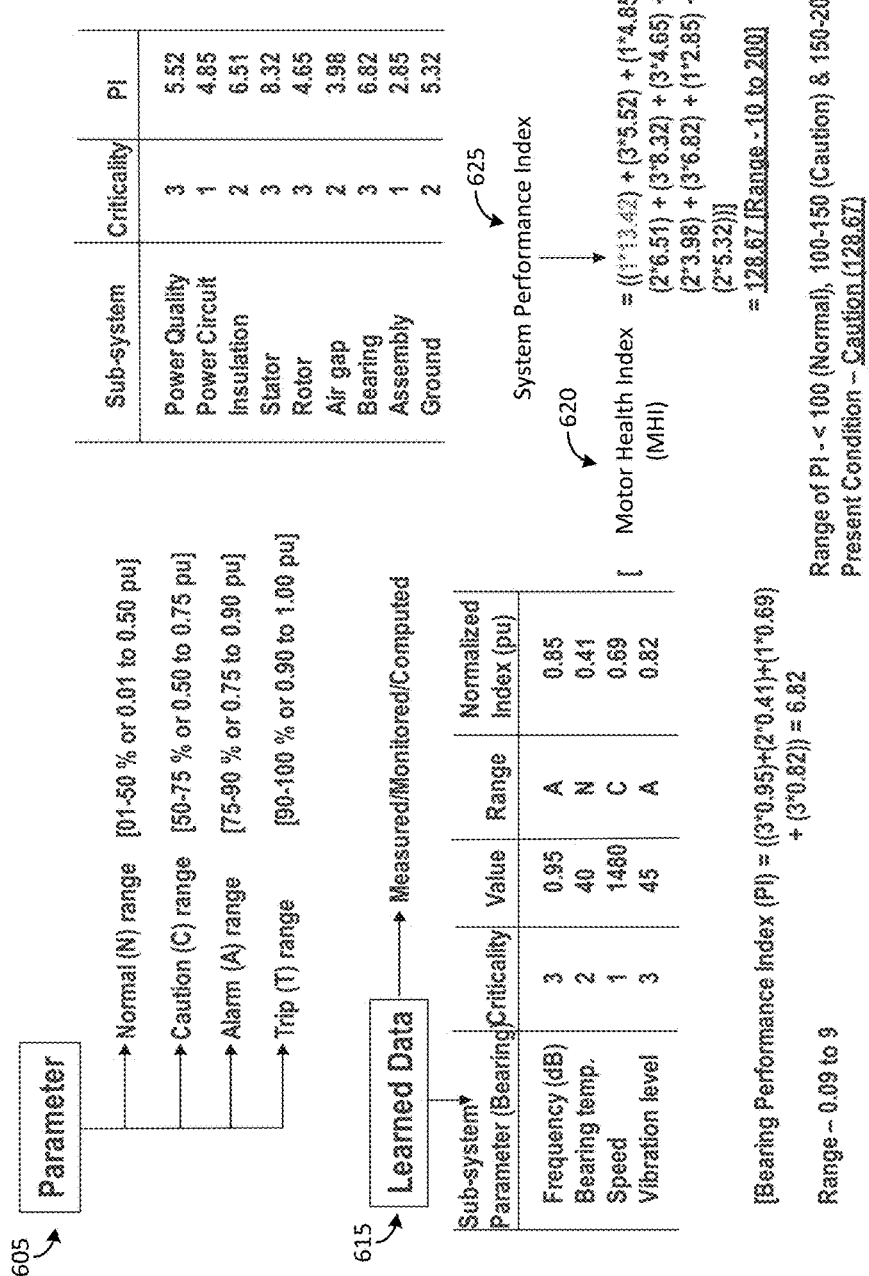

FIG. 8 illustrates another example implementation of the scheme shown in FIG. 6.

Figure 9:
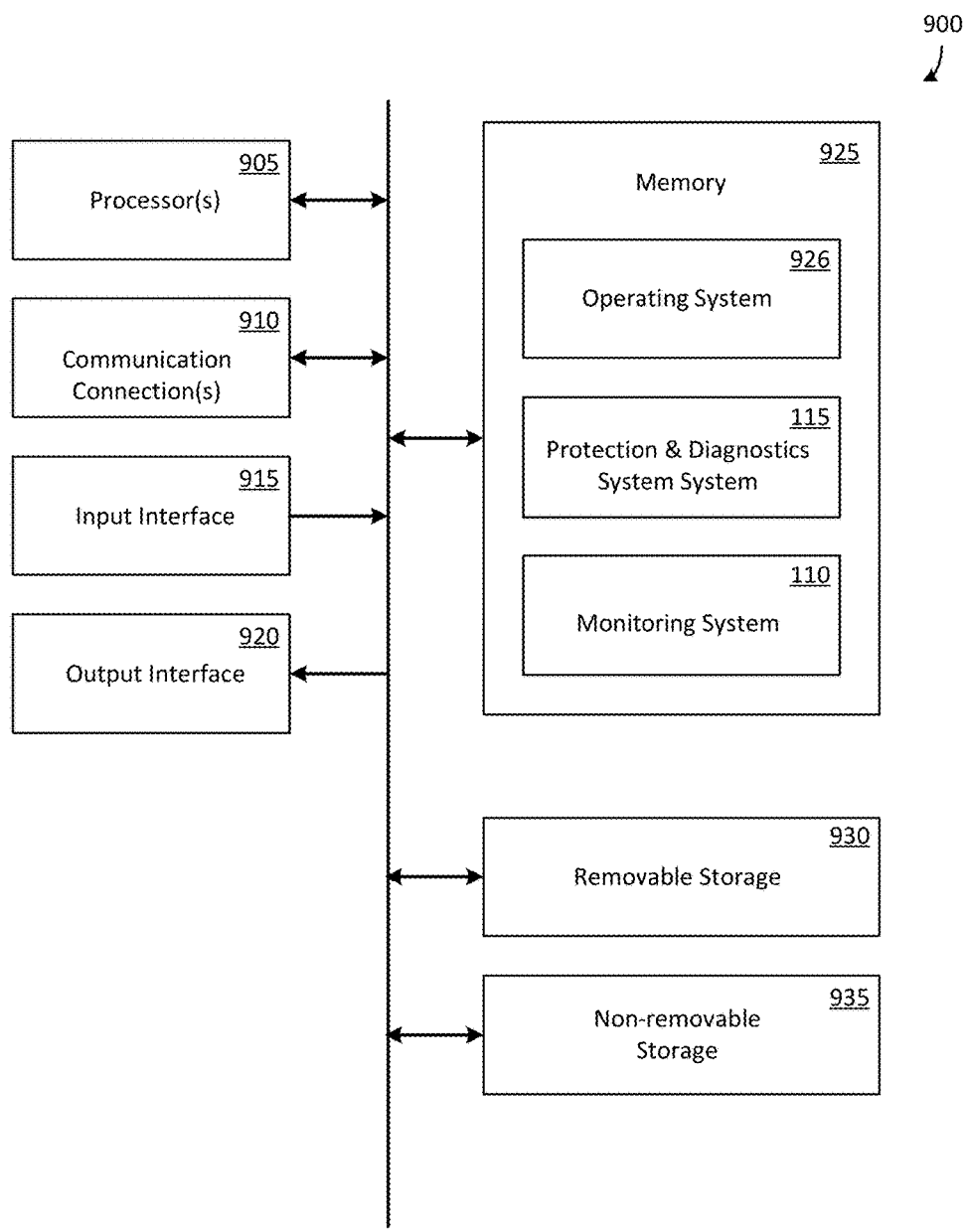

FIG. 9 shows an example computer incorporating a processor for executing a protection and diagnostic procedure in accordance with an embodiment of the disclosure.

DETAILED DESCRIPTION

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein; rather, these embodiments are provided so that this disclosure will satisfy applicable legal requirements. Like numbers refer to like elements throughout. It should be understood that certain words and terms are used herein solely for convenience and such words and terms should be interpreted as referring to various objects and actions that are generally understood in various forms and equivalencies by persons of ordinary skill in the art. It should be understood that the words "example" and "exemplary" as used herein are intended to be non-exclusionary and non-limiting in nature. More particularly, the word "exemplary" as used herein indicates one among several examples, and it should be understood that no undue emphasis or preference is being directed to the particular example being described.

Attention is first drawn to FIG. 1, which shows an exemplary protection and diagnostic system 115 coupled to a machine 105 that is characterized by "n" sub-systems 106 (n≥1) in accordance with an embodiment of the disclosure. The sub-systems 106 are generally defined by the nature, type, and application of the machine 105 and can include moving parts and/or stationary parts. Thus, for example, when the machine 105 is a motor, the sub-system 106-1 can be a rotor assembly, the sub-system 106-2 can be a stator assembly, and the sub-system 106-3 can be an air gap, insulator, a grounding bar, a connector, or a fuse, for example.

In general, and in accordance with various embodiments of the disclosure, the one or more sub-systems of the machine 105 can be selected on the basis of identifying some components of the machine 105 as relatively less critical components in comparison to some other components of the machine 105. Thus, for example, when the machine 105 is a motor, a component such as a mounting bolt may be identified as a less critical component in comparison to an armature of the motor. As can be understood, a failure in the armature has a more significant and immediate impact upon the operation of the motor whereas a failure in the mounting bolt can eventually lead to a failure in the armature (possibly due to excessive vibration of the motor housing). As another example, some components of the machine 105 that have a lower failure rate historically in comparison to other components can be deemed less critical sub-systems of the machine 105 in accordance with an embodiment of the disclosure. Various other criteria can be used to identify and categorize some or all of the one or more sub-systems of the machine 105 such that certain sub-systems may be left unmonitored in various traditional monitoring systems.

It should however be understood that in some embodiments in accordance with the disclosure, one or more sub-systems can include relatively critical components of the machine 105. For example, as indicated above, the sub-system 106-1 can be a rotor assembly that is deemed a critical component of a motor. Combining critical and non-critical sub-systems can allow for monitoring and processing of various interactions and dependencies between these two types of sub-systems. Furthermore, in some exemplary embodiments, the machine 105 can be represented as a digital asset in a software format that provides for combining the "n" physical sub-systems 106 and one or more virtual sub-systems that can be created in a computer.

A monitoring system 110 can be coupled to the machine 105 for monitoring one or more parameters of each of the one or more sub-systems. Towards this end, the monitoring system 110 can include one or more sensors 111 such as, a thermal sensor, a pressure sensor, a gas sensor, a chemical sensor, and/or an insulation breakdown sensor. A protection and diagnostic system 115 can be coupled to the monitoring system 110 and can also be coupled to the machine 105. The protection and diagnostic system 115 can include a protection system 116 having one or more protection devices such as relays, circuit breakers, fuses, limit switches, isolators and overload protectors. The diagnostic system 117 can be used to receive, via the one or more sensors 111, performance parameters of the various sub-systems, particularly when the machine 105 is in operation and one or more rotating parts of the machine 105 are rotating. The performance parameters can be used by the diagnostic system 117 to determine a system performance index of the machine 105.

In some exemplary implementations in accordance with the disclosure, data parameters can be measured by the one or more sensors 111 in a time-synchronized manner and can include a reference set of measured data values measured when the machine 105 is operating in a normal, healthy condition. In addition, time synchronization signal can be provided to one or more sensors by the monitoring system 110. The reference set of measured data values can be used as base line data to assess a health of the machine at any other given time. This can be carried out for example, by comparing the reference set of measured data values against a set of data parameters collected at a different time.

Furthermore, the diagnostic system 117 can use one or more protection models 118 and/or diagnostics models 121 to determine at least one sub-system performance index associated with at least one sub-system 106 of the machine 105. The sub-system performance index can then be combined with the system performance index to determine an asset health index. When the asset health index exceeds a threshold value, a trip signal can be generated. The trip signal can be provided to the protections system 116 for executing one or more protection and/or control operations such as tripping a circuit breaker (not shown), modifying an operation of the machine 105, or shutting down the machine 105. These aspects will now be described below in more detail.

FIG. 2 shows an exemplary architectural block diagram 200 that can be used to implement a protection and diagnostic procedure upon the machine 105 in accordance with an embodiment of the disclosure. It should be understood that in some exemplary implementations in accordance with the disclosure, the block labeled machine 105 can represent one or more machines and the protection and diagnostic procedure can be carried out for evaluating multiple machines by using comparative procedures that are applied to two or more machines. Measured data 210 can represent performance data obtained by using the monitoring system 110 to monitor various performance parameters of the machine 105. Computed data 215 can represent performance data computed by the protection and diagnostic system 115 from one or more measurements executed upon the machine 105. External data 220 can represent performance data pertaining to the machine 105 that can be obtained from external sources, such as from a manufacturer of the machine 105, from historical records, from other third-party monitoring devices over communication, fleet or reference model, machine offline test data, and/or statistical analysis.

The sub-system data tagging 225 generally indicates a process by which various components of the machine 105 are classified as tagged sub-assemblies. This can be carried out for example, by associating a first identification (ID) tag with a first component that can be a critical component, a second ID tag with a second component that can be a less critical component, and so on. The first component is indicated in FIG. 1 by the sub-system 106-1, the second component is indicated by the sub-system 106-2, and so on. The ID tags not only allow for identification of the various components of the machine 105 as relatively critical or non-critical components but can also be used by the protection and diagnostic system 115 to apply mapping procedures wherein some sub-systems can be classified as belonging to a first group and some other sub-systems as belonging to a second group, and so on. Configuration 230 represents various configuration related data such as set points, measured, monitored and/or computed data, and trip thresholds, which can be provided to the protection and diagnostic system 115.

The protection and diagnostic system 115 can generate records/reports 235 which can be complemented by offline data 260. The offline data 260, which is typically obtained when the machine 105 is in a shutdown condition or during a maintenance test cycle, can include various parameters such as a resistance of a winding or an insulation resistance. The protection and diagnostic system 115 can also generate various protection and diagnostic outputs 240 such as alarms and warnings. The alarms and warning may be provided in various formats, including visual formats, text-based formats, and/or level-based formats (such as minor, major, and critical alarms).

The various protection and diagnostic outputs 240 can be used to compute a sub-system risk priority 245 that can be applied to some or all of the sub-systems 106. Based on the sub-system risk priority 245, an overall assessment 250 of the machine 105 can be carried out. The overall assessment can provide information pertaining to a level of risk in the machine 105 and/or a condition of the machine 105, and can also be used as a predictor of the future health of the machine 105. Thus, in some cases, information provided by the overall assessment 250 can be used to provide recommendations 255 to address some undesirable current conditions of the machine 105 and/or to pre-emptively address or identify a future condition of the machine 105.

FIG. 3 shows an exemplary list of features that can be provided in a protection and diagnostic system coupled to the machine 105 (a motor, in this exemplary description) in accordance with an embodiment of the disclosure. Item 1 pertains to operational learned data, which can be obtained by capturing operational information of the machine 105. The operational information can include average, minimum, maximum, and/or derived values that are measured and/or computed using various mathematical or predictive functions and the classification of the "n" sub-systems 106. The operational information can be captured at pre-defined regular intervals, over a specific period of time, and/or for obtaining a pre-defined set of records. When computed automatically, the operational learned data can be automatically filtered and computed based on a product order code and on a grouping based on the "n" sub-systems 106. At least some of the data can be stored offline in the database 119 or elsewhere such as in a cloud repository and/or an external database after being captured in a first-in-first-out format. A warning can be provided to execute a data backup procedure when the captured data exceeds a predefined threshold. The learned data can be represented in various formats such as a table, a trend, a correlation model, or a comparison model. The comparison model can be provided in the form of a rate of change model with respect to a baseline model.

Item 2 pertains to a motor start summary, which can include transient and/or instantaneous data related to energization conditions and/or startup conditions of the motor. The data can indicate average, minimum, maximum, and/or derived values collected for a predefined number of cycles.

Item 3 pertains to a motor stop summary, which can include de-energization characteristics data related to a number of motor stop conditions and/or trip conditions of the motor. The motor stop conditions and/or trip conditions can be associated with normal stop conditions and/or with abnormal stopped conditions.

Item 4 pertains to an integrated fault report that captures various steady state and pre/post electrical, thermal, and mechanical diagnostic data after a major event occurrence in the motor. This data can be captured using the classification of the "n" sub-systems 106. The integrated fault report can be generated using a trigger source that is configurable on the basis of an operand such as an operand based on flex logic. The integrated fault report can also be generated using oscillography initiated by various types of triggers.

Item 5 pertains to an asset health report that provides an overall condition assessment of the motor in the form of a health index. The health index can be based on risk prioritization of each of the "n" sub-systems 106 and provided in the form of a consolidated report. The asset health report can be generated within a configurable time period based on various items such as asset name plate information, monitored information, operational learned data, data trends, baseline data, reference data, protection summary reports, alarm reports, maintenance data, data analytics, and signature/spectral analysis.

Item 6 pertains to motor models, some examples of which are provided elsewhere in this disclosure.

Item 7 pertains to external diagnostics data that can be obtained by using elements such as a protection relay configured to collect data based on various time-based and event-based criteria.

Item 8 pertains to pre and/or post event data captured using the classification of the "n" sub-systems 106.

Item 9 pertains to signature analysis (and/or spectrum analysis) directed at identifying undesirable components in one or more electrical signals being analyzed, for example, as a result of an occurrence of a fault condition at a sub-system level. The signature/spectrum analysis can be initiated upon detection of a fault, in some exemplary embodiments.

Item 10 pertains to an event log that can be provided using the classification of the "n" sub-systems 106.

Item 11 pertains to historical maximum values over the life of the motor that can be based on measured and/or computed data using the classification of the "n" sub-systems 106.

Item 12 pertains to sub-system analysis data that can be monitored, measured, and/or computed using tags for identifying each of the "n" sub-systems 106.

Item 13 pertains to data correlation and/or analytics models that can be created by trending learned data and applying predictive functions related to each of the "n" sub-systems 106.

Item 14 pertains to offline test data that can be saved for use along with online data in some exemplary implementations.

Attention is now drawn to FIG. 4, which illustrates an exemplary operational architecture 400 of an exemplary protection and diagnostic system that can incorporate some or all of the exemplary list of features shown in FIG. 3. As such, the exemplary operational architecture 400 of FIG. 4 will now be described using the exemplary list of features shown in FIG. 3. It may be pertinent to point out that the numbers indicated inside dashed line boxes in FIG. 4 correspond to various item numbers in the list of features shown in FIG. 3.

Data acquisition and parameter calculation 415 can be executed in multiple ways. For example, data can be acquired on the basis of external monitoring and diagnostics (item 7 in the list of features shown in FIG. 3). The acquisition of such data can be carried out on a time-synchronized basis so as to enable application of time stamps to this data. The acquired data can be used to execute various types of calculations that can generate time-specific data such as stop trends and/or stop data 420 and start trends and/or start data 410. The stop trends and/or stop data 420 can be associated with stopping characteristics of the machine 105 and the start trends and/or start data 410 can be associated with starting characteristics of the machine 105. The stop trends and/or stop data 420 and the start trends and/or start data 410 can be combined to generate historical trends and/or historical data 425 of the machine 105. The data acquisition and parameter calculation 415 can also be used to determine a healthy versus operating mode 435, the determination carried out at least in part, by comparing a healthy status of the machine 105 to a current operational status of the machine 105.

The data acquisition and parameter calculation 415 can be used for various purposes, including the generation of an integrated fault report 405 (corresponding to item 4 in the list of features shown in FIG. 3). The data acquisition and parameter calculation 415 can also be used when carrying out parameter level monitoring of the machine 105 and/or evaluating an operational performance 440. The operational performance 440 can be associated with item 1 (operational learned data) and/or item 11 (historical max record) in the exemplary list of features shown in FIG. 3. Operational performance 440 pertains to various parameters of the machine 105 such as efficiency, thresholds, utilization, loading, and temperature, that can be obtained at least in part via the data acquisition and parameter calculation 415.

The system performance index 445 can be determined by the diagnostic system 117 (shown in FIG. 1) based on monitoring the operational performance 440 of the machine 105. In an exemplary implementation in accordance with the disclosure, the monitoring can be carried out in real time by the monitoring system 110 and/or by personnel (engineers, technicians, operators, etc.) on a real time basis to address any potential operational issues.

The monitoring system 110 can be further used for sub-system level monitoring 450, parameter level monitoring 465, and/or failure mode monitoring 470. Parameter level monitoring 465 can be used to provide level categorization (such as normal, caution, alarm) by which various parameters of the machine 105 can be classified. Failure mode monitoring 470 can incorporate the use of various protection models and/or predictive analyzers. The models can include a motor model (item 6 in the list of features shown in FIG. 3), a thermal model, an electrical current imbalance, a ground current model, an overload model, a historical model, a data model obtained from learned data, an electrical signature analysis model, a diagnostic model, and a predictive model.

Information derived from sub-system level monitoring 450, parameter level monitoring 465, and/or failure mode monitoring 470 can be used in combination with performance and sub-system level diagnosis 485 as a part of sub-system analysis (item 12 in the list of features shown in FIG. 3). The results of this sub-system analysis can be used to generate various reports of the machine 105, such as a health report, service report, and indicator report 495 and/or a visualization report. The reports can also be generated for example, by using data indicated by pre/post analysis and monitoring and diagnostic event capture 460. These reports, which can be combined with historical trends and historical data 425, can be provided to a diagnostic device 496. In some exemplary embodiments, the diagnostic device 496 can be a computer that is configured to carry out offline data analysis (item 14 in the list of features shown in FIG. 3). In some other exemplary embodiments, the diagnostic device 496 can include a protection device such as a relay, and/or a graphical user interface that can be used by a human operator to interact with the protection and diagnostic system 115 in order to control and/or modify one or more operations of the machine 105 based on one or more of the reports.

Referring back to sub-system level monitoring 450, parameter level monitoring 465, and/or failure mode monitoring 470, the data generated by these monitoring activities can be used to derive various sub-system performance indices 455. These sub-system performance indices 455 can be derived on an online basis and/or on a historical basis. Sub-system performance indexes 455 can be cross-correlated with sub-system health indicators 480 (as indicated by sub-systems correlations 475). The cross-correlation can provide an indication of an impact of a fault in a first subs-system of the sub-systems 160 upon a second sub-system among the sub-systems 160, such as the impact of a non-critical sub-system upon a critical sub-system or vice versa.

FIG. 5 illustrates exemplary aspects of the protection and diagnostic system 115 when applied to a motor 500 in accordance with an embodiment of the disclosure. List 505 shows a few exemplary performance parameters that can be evaluated when determining the system performance index (box 445 in FIG. 4). These exemplary performance parameters can include an overload factor, efficiency, a current unbalance, stator/rotor/bearing RTD, ESA plus I/O, THD/HDF, and/or accumulators/learned data. List 510 shows a few exemplary performance parameters that can be evaluated when determining the sub-system performance index (box 455 in FIG. 4). These exemplary performance parameters can include sub-system I/O, subsystem ESA, sub-system computed data, sub-system learned data, sub-system nameplate data, sub-system events data, sub-system monitored data, and/or sub-system metering data. List 515 shows a few exemplary performance parameters that can be evaluated when determining the asset health index (box 490 in FIG. 4). These exemplary performance parameters can include sub-system wise PI, performance index, and/or motor nameplate data. In general, the performance parameters of the motor 500 can include operational data and/or structural data such as an electrical imbalance, a ground current, an overload condition, bearing damage, broken rotor bars, stator insulation failure, stator inter-turn failure, misalignment, foundation looseness and overheating.

FIG. 6 illustrates a scheme indicating a few example aspects that can be considered when computing some performance indexes such as a motor health index 620 (of the motor 500), a system performance index 625, and a sub-system performance index 630 in accordance with an embodiment of the disclosure. Various values can be defined for a parameter 605 such as what constitutes a normal range, a caution range, an alarm range, and/or a trip range for the parameter 605. Some exemplary numerical values are shown to illustrate this aspect in more detail. The motor health index 620 can be determined using an exemplary formula that incorporates one or more constants. These constants can be defined based on various factors such as sub-system priority, criticality and/or short-term monitoring impact. The motor health index 620 can also be provided in the form of a risk priority number indicative of a health of the motor.

The current value 610, which is indicative of various values associated with the machine 105 at any given moment in time ("current" time) can include various parameters that are used to determine the system performance index 625. As indicated above with reference to FIG. 4, (block 445) the system performance index 625 can include real-time monitoring carried out by personnel (engineers, technicians, operators, etc.) on a real time basis to address any potential operational issues. This process can be deemed as short-term monitoring. On the other hand, the sub-system performance index 630, which can be determined using the learned data 615 can be deemed long-term monitoring that can be carried out for diagnostic and preventive purposes upon not only one machine but on a fleet of machines as well.

In some exemplary embodiments, the system performance index 625, which can be used for short-term monitoring, can be derived as a weighted normalized index from current steady state operational data. The sub-system performance index 630, which can be used for long-term monitoring, can also be derived as a weighted normalized index from current steady state operational data, learned data, and/or historical data.

FIG. 7 illustrates an example implementation of the scheme shown in FIG. 6. In this example implementation, the numerical system performance index 625 can be calculated using the motor health index 620 formula (FIG. 6) and based on some exemplary current values that can be monitored, measured, and/or computed. The numerical system performance index 625 can then be assessed against the parameter 605 (FIG. 6) to identify a current/present condition of a motor. In the example implementation shown in FIG. 7, the system performance index 625 is determined to be 13.42 and the present condition classified as "caution."

FIG. 8 illustrates another exemplary implementation of the scheme shown in FIG. 6. In this exemplary implementation, learned data 615 can be used to determine the motor health index 620 (FIG. 6) based on the exemplary numerical system performance index 625 (FIG. 7). The numerical motor health index 620 can then be assessed using the parameter 605 (FIG. 6) to identify a current condition of a machine. In this example, the motor health index 620 is determined to be 128.67 and the present condition classified as "caution."

FIG. 9 illustrates an example computer 900 incorporating one or more processors, such as a processor 905, for executing a machine protection and diagnostic procedure upon the machine 105 shown in FIG. 1. The processor 905 can be implemented and operated using appropriate hardware, software, firmware, or combinations thereof. Software or firmware implementations can include computer-executable or machine-executable instructions written in any suitable programming language to perform the various functions described. In one embodiment, instructions associated with a function block language can be stored in the memory 925 and executed by the processor 905.

The memory 925 can be used to store program instructions that are loadable and executable by the processor 905, as well as to store data generated during the execution of these programs. Depending on the configuration and type of the machine 105 and/or the machine protection and diagnostic procedure, the memory 925 can be volatile (such as random access memory (RAM)) and/or non-volatile (such as read-only memory (ROM), flash memory, etc.). In some embodiments, the memory devices can also include additional removable storage 930 and/or non-removable storage 935 including, but not limited to, magnetic storage, optical disks, and/or tape storage. The disk drives and their associated computer-readable media can provide non-volatile storage of computer-readable instructions, data structures, program modules, and other data. In some implementations, the memory 925 can include multiple different types of memory, such as static random access memory (SRAM), dynamic random access memory (DRAM), or ROM.

The memory 925, the removable storage, and the non-removable storage are all examples of non-transient computer-readable storage media. Such non-transient computer-readable storage media can be implemented in any method or technology for storage of information such as computer-readable instructions, data structures, program modules or other data. Additional types of non-transient computer storage media that can be present include, but are not limited to, programmable random access memory (PRAM), SRAM, DRAM, ROM, electrically erasable programmable read-only memory (EEPROM), compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the processor 505. Combinations of any of the above should also be included within the scope of non-transient computer-readable media.

Turning to the contents of the memory 925, the memory 925 can include, but is not limited to, an operating system (OS) and one or more application programs or services for implementing the features and aspects disclosed herein. Such applications or services can include software and/or firmware portions of the protection and diagnostic system 115 and/or the monitoring system 110. For example, the memory 925 can include the protection models 118, the diagnostics models 121, the database 119, and some portions of the diagnostic system 117 that are shown in FIG. 1.

Many modifications and other embodiments of the example descriptions set forth herein to which these descriptions pertain will come to mind having the benefit of the teachings presented in the foregoing descriptions and the associated drawings. Thus, it will be appreciated the disclosure may be embodied in many forms and should not be limited to the exemplary embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A machine protection and diagnostic system comprising:
    a diagnostic system configured to generate at least one of a trip signal or an alarm signal by executing a diagnostic procedure upon a machine having one or more moving parts, the diagnostic procedure comprising:
        using one or more sensors coupled to the machine to obtain one or more performance parameters of the machine when the machine is in operation;
        deriving a system performance index of the machine based on the one or more performance parameters;
        deriving a sub-system performance index of a sub-system of the machine based on one or more protection models;
        deriving an asset health index based on combining the system performance index and the sub-system performance index; and
        generating the at least one of the trip signal or the alarm signal when the asset health index exceeds a threshold value; and
    a protection system comprising a protection device configured to receive the trip signal and execute a protective action upon the machine.

2. The system of claim 1, wherein the one or more moving parts comprise one or more rotating parts and wherein using the one or more sensors coupled to the machine to obtain the one or more performance parameters of the machine comprises obtaining the one or more performance parameters when the one or more rotating parts are rotating.

3. The system of claim 1, wherein the machine is a motor and the sub-system comprises a rotor.

4. The system of claim 3, wherein the one or more performance parameters of the machine comprises at least one of an electrical current imbalance in the machine, a ground current in the machine, an overload condition in the machine, or an overheating condition in the machine, and wherein the one or more protection models is at least one of a historical model or a predictive model of the rotor.

5. The system of claim 1, wherein the machine is a motor and the sub-system includes a stationary part, and wherein at least one moving part of the one or more moving parts is operatively inter-dependent on the stationary part.

6. The system of claim 5, wherein:
    the at least one moving part is a rotor;
    the diagnostic procedure further comprises using at least one diagnostic model to derive at least one of a health index or at least one other performance index associated with the sub-system;
    the one or more protection models includes at least one of a thermal model or an unbalance model; and
    the at least one diagnostic model includes at least one of a historical model, an electrical signature analysis based model, or a predictive model of the rotor.

7. The system of claim 6, wherein the one or more performance parameters of the motor comprises at least one of an electrical current imbalance in the motor, a ground current in the motor, an overload condition in the motor, or an overheating condition in the motor, and wherein the one or more protection models is at least one of a historical model or a predictive model of at least one of the rotor or a stator.

8. The system of claim 1, wherein the system performance index is derived in real time and the sub-system performance index is derived using historical data.

9. The system of claim 1, wherein the one or more protection models comprises at least one of a motor model, a thermal model, a ground current model, an overload model, an electrical signature analysis model, or a diagnostic model.

10. A system comprising:
    at least one sensor coupled to a machine containing one or more rotating parts, the at least one sensor configured to obtain one or more performance parameters of the machine when the one or more rotating parts are rotating;
    a database configured to at least store data indicative of a historical trend of the one or more performance parameters; and
    a diagnostic system comprising a processor, the processor configured to execute a diagnostic procedure, the diagnostic procedure comprising:
        deriving a system performance index of the machine based on the one or more performance parameters obtained by the at least one sensor;
        using the data stored in the database to derive at least one sub-system performance index that is associated with a sub-system of the machine;
        deriving an asset health index based on combining the system performance index and the at least one sub-system performance index; and
        generating at least one of a warning signal or a trip signal when the asset health index exceeds a threshold value, the trip signal operative to initiate a protective action upon the machine.

11. The system of claim 10, further comprising at least one protection device configured to receive the trip signal and execute a protective action upon the machine.

12. The system of claim 10, wherein the machine is a motor and the one or more rotating parts is a rotor.

13. The system of claim 12, wherein the one or more performance parameters of the machine comprises at least one of an electrical current imbalance in the machine, a ground current in the machine, an overload condition in the machine, or an overheating condition in the machine and wherein the data stored in the database further includes at least one of a historical model or a predictive model of the rotor.

14. The system of claim 10, wherein the machine is a motor and the sub-system includes a stationary part, and wherein at least one moving part of the one or more moving parts is operatively inter-dependent on the stationary part.

15. The system of claim 14, wherein the stationary part is a stator.

16. A non-transitory computer-readable storage medium having stored thereon, instructions executable by a computer for performing operations comprising:
   obtaining from one or more sensors coupled to a machine, one or more performance parameters of the machine when at least one rotating part of a sub-system of the machine is rotating;
   deriving a system performance index of the machine based on the one or more performance parameters;
   using one or more protection models to derive at least one sub-system performance index that is associated with the sub-system;
   deriving an asset health index based on combining the system performance index and the at least one sub-system performance index;
   generating a trip signal when the asset health index exceeds a threshold value; and
   transmitting the trip signal to at least one protection device to execute a protective action upon the machine.

17. The non-transitory computer-readable storage medium of claim 16, wherein the machine is a motor and the sub-system is a rotor.

18. The non-transitory computer-readable storage medium of claim 17, wherein the one or more performance parameters of the machine comprises at least one of an electrical current imbalance in the machine, a ground current in the machine, an overload condition in the machine, or an overheating condition in the machine and wherein the one or more protection models is at least one of a historical model or a predictive model of the rotor.

19. The non-transitory computer-readable storage medium of claim 16, wherein the machine is a motor and the sub-system includes a stationary part.

20. The non-transitory computer-readable storage medium of claim 19, wherein the stationary part is a stator.

* * * * *